United States Patent
Charlton et al.

(10) Patent No.: US 7,878,190 B2
(45) Date of Patent: Feb. 1, 2011

(54) SOLAR COLLECTION APPARATUS, SOLAR COLLECTION ARRAYS, AND RELATED METHODS

(76) Inventors: Walter T Charlton, 230 Kirkley Rd., Annapolis, MD (US) 21401-1102; C. Leland Sampson, 1511 Wild Cranberry Dr., Crownesville, MD (US) 21032

(*) Notice: Subject to any disclaimer, the term of this patent is extended or adjusted under 35 U.S.C. 154(b) by 0 days.

(21) Appl. No.: 12/142,512

(22) Filed: Jun. 19, 2008

(65) Prior Publication Data
US 2009/0133686 A1    May 28, 2009

Related U.S. Application Data

(60) Provisional application No. 60/996,643, filed on Nov. 28, 2007.

(51) Int. Cl.
*F24J 2/18* (2006.01)
(52) U.S. Cl. .................. 126/686; 126/685; 126/600; 126/704
(58) Field of Classification Search ............ 126/600, 126/685, 686, 692, 694, 695, 704
See application file for complete search history.

(56) References Cited

U.S. PATENT DOCUMENTS

| | | | |
|---|---|---|---|
| 2,969,788 A | 1/1961 | Newton | |
| 3,905,352 A | 9/1975 | Jahn | |
| 3,964,464 A | 6/1976 | Hockman | |
| 3,982,527 A | 9/1976 | Cheng et al. | |
| 4,003,638 A | 1/1977 | Winston | |
| 4,067,319 A | 1/1978 | Wasserman | |
| 4,088,121 A | 5/1978 | Lapeyre | |
| 4,162,824 A | 7/1979 | Ma | |
| 4,228,789 A | 10/1980 | Kay | |
| 4,297,988 A | 11/1981 | Hanson | |
| 4,444,176 A | 4/1984 | Hanson | |
| 4,481,936 A | 11/1984 | Gregory | |
| 4,495,938 A | 1/1985 | Hanson | |
| 5,977,478 A | 11/1999 | Hibino et al. | |
| 2009/0133686 A1* | 5/2009 | Charlton et al. ............. | 126/600 |

* cited by examiner

*Primary Examiner*—Alfred Basichas
(74) *Attorney, Agent, or Firm*—Abraham Hershkovitz; Harold L. Novick; Hershkovitz & Associates, LLC

(57) ABSTRACT

A solar collection apparatus includes a housing with a first opening, a second opening, and a partially-mirrored floor. The device includes fins with first and second end segments and curved bodies. Both sides of the fin bodies have the same curvature, and both sides are mirrored. The curved bodies of the fins all have the same curvature. The floor and the second end segments of the fins together define a light pipe. Light impinging on the first opening of the housing is directed into the light pipe by reflection between adjacent faces of adjacent fins. The second end segments of the fins prevent the light within the light pipe from exiting the light pipe in the first direction. Light within the light pipe exits the light pipe at the second opening, where it may be stored, or may be directed to a solar energy device such as a solar cell, turbine, or vehicle heater.

22 Claims, 11 Drawing Sheets

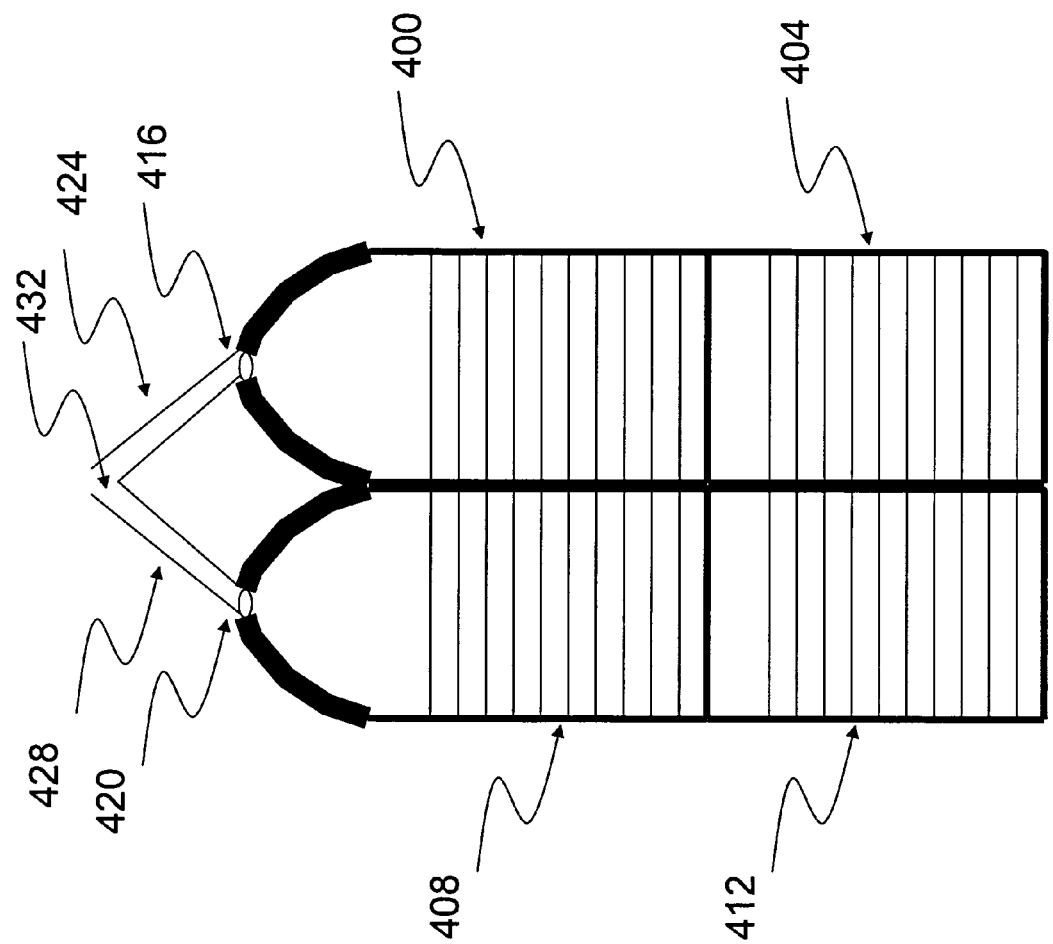

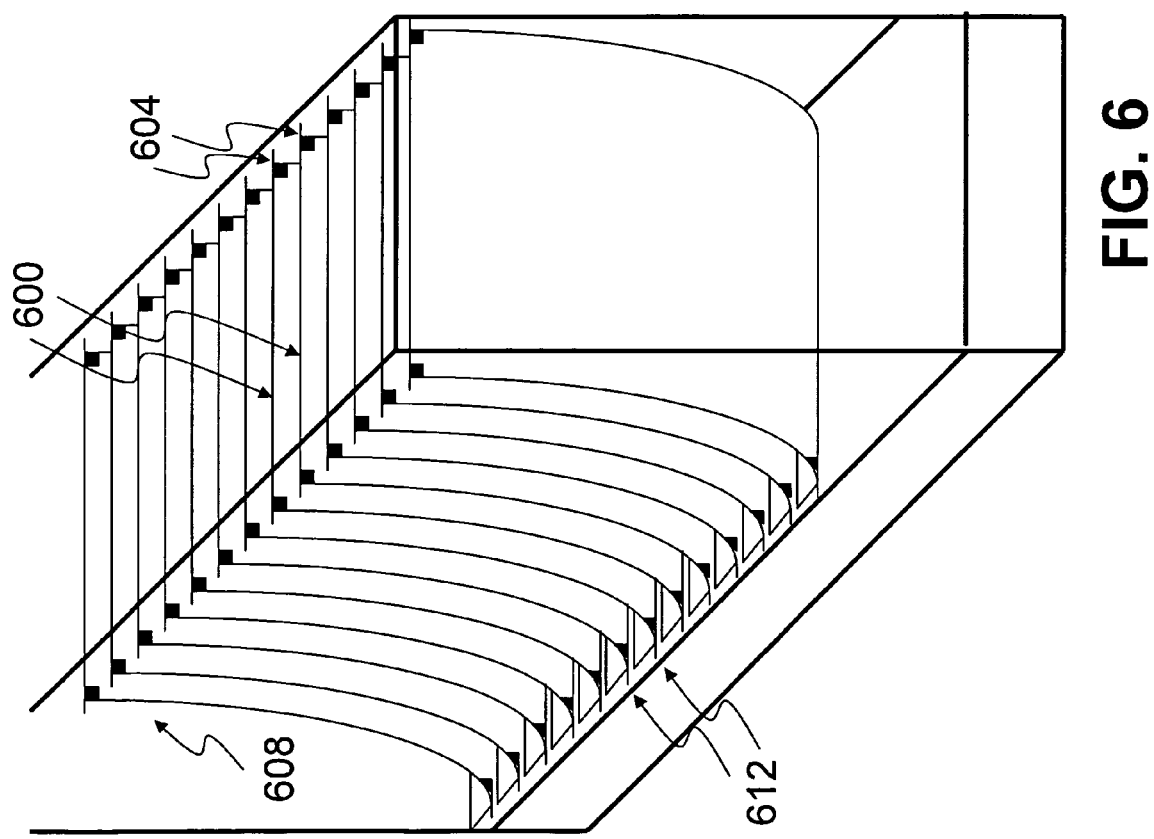

SOLAR COLLECTION APPARATUS, SOLAR COLLECTION ARRAYS, AND RELATED METHODS

CROSS-REFERENCE TO RELATED APPLICATIONS

This application claims the benefit of U.S. Provisional Patent Application No. 60/996,643, filed Nov. 28, 2007, the contents of which are hereby incorporated by reference in their entirety.

BACKGROUND OF THE INVENTION

1. Field of the Invention

The present disclosure relates to the collection of solar energy, and in particular to apparatuses, arrays, and methods for collecting solar energy at high efficiency.

2. Related Art

Applicants have identified a number of U.S. patents that utilize curved mirrors for solar energy collection, including U.S. Pat. No. 3,964,464 to Hockman, U.S. Pat. No. 2,969,788 to Newton, U.S. Pat. No. 4,067,319 to Wasserman, and U.S. Pat. No. 4,228,789 to Kay.

However, none of these prior U.S. patents discloses the inventive aspects of the presently disclosed apparatuses, arrays, and methods.

SUMMARY OF THE INVENTION

In one aspect, the present invention includes a solar collection apparatus. The apparatus has a first opening, a second opening, and a floor. The floor is at least partially mirrored. The apparatus includes an array of non-linear, adjacent fins attached to the housing. Each fin has a first end segment extending in a first direction toward the first opening, and a second end segment extending in a second direction substantially parallel to the floor. The second end segment is at least partially mirrored. Each fin also includes a body between the first end segment and the second end segment. The body has a first face and a second face. The first and second faces have substantially the same curvature, and adjacent faces of adjacent fins also have substantially the same curvature as each other and as that of the adjacent fins. Each face of each fin which faces an adjacent face of an adjacent fin is at least partially mirrored. The floor and the second end segments of the fins together define a "light pipe." At least some light impinging on the first opening is directed into the light pipe by reflection between adjacent faces of adjacent fins. The second end segments of the fins prevent the light within the light pipe from exiting the light pipe in the first direction. The light within the light pipe exits the light pipe at the second opening.

In some embodiments, the housing has two side walls and one front wall. The fins are attached to the housing at the side walls, and the second opening is located in the front wall. In some embodiments, the side walls are at least partially mirrored.

In some embodiments, the end segments of the fins are flat, and the fin bodies have a circular curvature. In other embodiments, the fin bodies have a parabolic, hyperbolic, or elliptical curvature.

In some embodiments, the fin bodies have curvatures with no flat surfaces.

In some embodiments, the apparatus includes a fiber optic cable or a fiber optic cable fitting at the second opening.

In some embodiments, the apparatus includes mirrors and/or lenses for gathering or focusing the light at the second opening.

In some embodiments, aligning means are provided at corners of the fins, and the corners are aligned so that the first direction faces the sun when in use. In some embodiments, the aligning means include plastic muscles. In some embodiments, the aligning means include wires connecting the corners of adjacent fins.

In some embodiments, first and second apparatuses are adjacent to each other. The first apparatus has a third opening, which is adjacent to the second opening of the second apparatus. In this way, light which exits the light pipe of the second apparatus at the second opening enters the light pipe of the first apparatus at the third opening.

In some embodiments, the housing is in the form of a rectangular tile.

In some embodiments, the distance from end edges of the fins to the floor, measured in a direction perpendicular to the floor, is less than 0.5 inches.

The apparatus may be disposed at a surface of an object, a roof of a vehicle, a roof of a building, a shingle of a building, a paint-like layer covering a building, a vehicle cover, a vehicle sunshade, and/or an article of clothing.

The apparatus may include at least one solar energy device, such as a solar cell, turbine, vehicle heater, solar energy storage device, heat storage device, or another such device, positioned to receive the light exiting the light pipe at the second opening.

In some embodiments, each fin has a constant thickness throughout its body.

In some embodiments, each said face of each said fin and each adjacent said face of each adjacent said fin are substantially concentric.

The present disclosure is also directed to a method of collecting solar energy. The method includes the steps of: receiving incoming sunlight, and reflecting the incoming sunlight between parallel mirrored fins of substantially the same curvature. The first end segments of the fins extend in a first direction toward the incoming sunlight, and the second end segments of the fins extend in a second direction perpendicular to the second direction. The method also includes the steps of directing the incoming sunlight into a light pipe defined at least by the second end segments of the fins, preventing light in the light pipe from exiting the light pipe in the first direction, and allowing light in the light pipe to exit the light pipe in the second direction.

In some embodiments, the first end segments of the fins are periodically aligned, so that the first direction faces the sun as the sun moves.

The present disclosure can be distinguished from the prior art in many ways. As non-limiting examples, the present disclosure includes fins having a constant thickness and no flat edges throughout their bodies, fins having extended second ends substantially parallel to the floor of their housing, and adjacent fins having adjacent faces which are substantially concentric.

In contradistinction, U.S. Pat. No. 4,067,319 to Wasserman describes troughs formed by triangular bodies. Each triangular body has a thickness which varies throughout each body, and each adjacent body has an adjacent face with an opposite curvature, which is neither the same nor concentric.

Also in contradistinction, U.S. Pat. No. 4,228,789 to Kay describes curved mirrors. Each mirror has a thickness which varies along the mirror, and flat edges on one side of the mirror. Each mirror lacks a second end substantially parallel to the floor of its housing, and adjacent mirrors have adjacent faces with different curvatures, which are neither the same nor concentric.

Operation of solar collection apparatuses according to the present disclosure are believed to be in accordance with known electromagnetic laws, such as those described by Maxwell's equations. The present disclosure describes non-imaging solar collection apparatuses, which concentrate and redirect light through a careful arrangement of mirrored fins, which each reflect light in accordance with the law of reflection, relative to a normal line perpendicular to the curvature of the fin at the point of reflection. Minimal energy is lost during this reflection, and no more energy is output by the apparatus than is incident on the apparatus; the output solar energy is merely concentrated into a smaller area for easier use.

BRIEF DESCRIPTION OF THE DRAWINGS

The features, nature, and advantages of the presently disclosed methods and apparatuses will become more apparent from the detailed description set forth below when taken in conjunction with the drawings in which like reference characters identify corresponding items throughout.

FIG. 4 is a top plan view of four solar collection apparatuses united together according to another aspect of the present disclosure;

FIG. 6 is a perspective view of one aspect of a solar collection apparatus configured for solar tracking according to the present disclosure;

DETAILED DESCRIPTION

As will be shown, it is one object of the present disclosure to direct incoming light beams into a single direction that is not necessarily their incoming direction from the sun. Although most sunlight hits perpendicular to the roof of a house throughout most of the day, it is in some circumstances impractical to convert the sunlight into energy at the roof, and it may be ideal to collect and carry the sunlight to an edge of the roof, or down into the building. As a non-limiting example, the present disclosure is designed to work with the previous disclosure of one of the present inventors, as set forth in U.S. Pat. No. 6,434,942, the contents of which are hereby incorporated by reference in their entirety. In this design, heat from the sun is utilized at the side of a building as part of a fluid-circulation loop. However, gathering the sunlight and heat at the side of the building is impractical, because the majority of sunlight arrives at the roof. Thus, through the use of the present disclosure, sunlight may be collected at the roof, and carried in a singular direction to and down the side of the building for use as set forth in the above identified U.S. patent. Of course, light may additionally be collected at the side of the building as disclosed in the above identified U.S. patent, such as via the "power bricks" disclosed therein. In general, however, the following disclosure is useful wherever efficiency can be improved by gathering non-coherent light in a non-imaging manner.

Figure 1A:
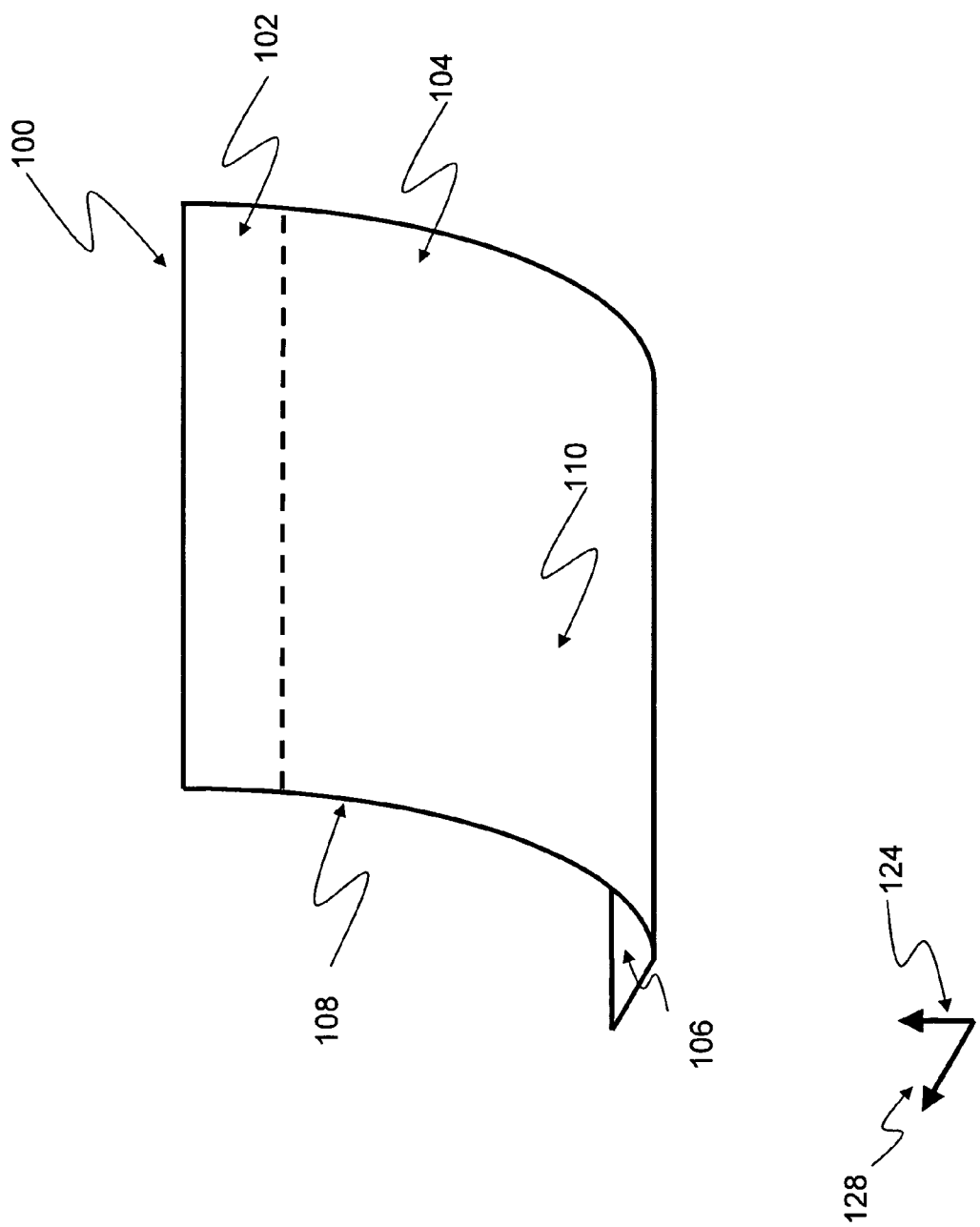
FIG. 1a is a perspective view of a fin for a solar collection apparatus according to the present disclosure.

In one aspect, the present disclosure includes a solar collection apparatus comprising a plurality of fins. One such fin will now be described with reference to FIG. 1a. As shown in FIG. 1a, fin 100 comprises a first end segment 102 extending in a first direction 124, and a second end segment 106 extending in a second direction 128. As illustrated, first direction 124 and second direction 128 are substantially perpendicular, although this need not always be the case. As used throughout this application, the term "substantially" shall refer to a reasonable tolerance, such as 10% variability in any direction. Fin 100 also has an arcuate or curved body 110, with a first face 104 and a second face 108. The curved body 110 will typically have a circular curvature. Although other curvatures may be used, it has been found that a circular curvature works best for capturing light according to the present disclosure.

The first face 104 and second face 108 have substantially the same curvature, and both faces are partially mirrored. The term "mirrored" can mean that the fins are formed of a one or more structural material and then layered with a reflective coating material (such as, as a non-limiting example, Mylar coated plastic or Mylar coated glass). The term "mirrored" can also mean that the fins are formed entirely of a reflective material, or have the structural frame at their perimeter but are otherwise fully formed of a reflective material. These are merely examples, and other designs may be used. In general, any material or combination of materials may be used for the fins, to meet the needs of various applications, so long as the fins are sufficiently reflective where described above. Also, although shown as curved squares or curved rectangles, other shaped fins may be used where appropriate. Also, the fin material may be selected for its manner of handling heat, so as to prevent the array from overheating.

Figure 1B:
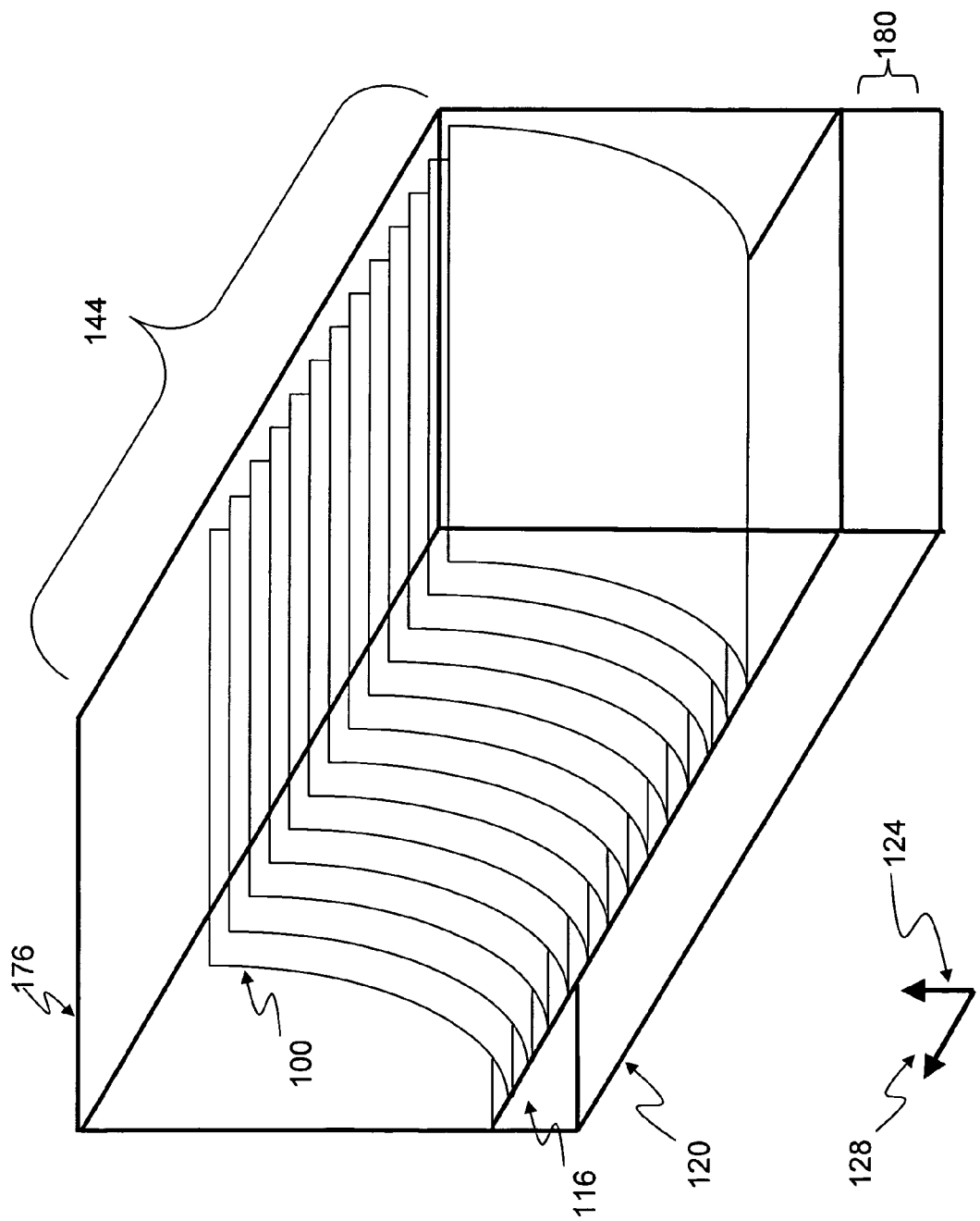
FIG. 1b is a perspective view of a solar collection apparatus according to the present disclosure, in which a plurality of fins in an array are disposed.

A plurality of fins 100 according to FIG. 1a are used together in a solar collection apparatus according to the present disclosure. Such a solar collection apparatus is illustrated in FIG. 1b. As shown in FIG. 1b, the solar collection apparatus includes a housing 176 with a floor 120 which is at least partially mirrored, with a first opening 144 at its top, and with a second opening 116 at its far end. The housing may be opaque or mirrored at its sides, but closest to the viewer of the Figure no side or rear wall are shown, for ease of disclosure. The housing also includes a plurality of fins 100 attached thereto. As a non-limiting example, the fins may be attached to side walls of the housing. As shown, adjacent faces of the fins have substantially identical curvature to each other. The top of each fin extends in the first direction 124, while the bottom of each fin extends in the second direction 128, and the body of the fin is curved in between. The first direction 124 points in the direction of the opening 144. The second direction 128 is approximately parallel with the surface of the floor 120. Together, the floor 120 and the second end segments of the fins 106 help to form a "light pipe" 180. Although the tops of the fins are shown pointing in the same direction, in some aspects each top of each fin may point in its own direction, to maximize light entry. Optionally, and as shown in FIG. 1b, each fin 100 has a constant thickness throughout its body 110, and adjacent faces of adjacent fins are substantially concentric. The fins may be envisioned as flat curves in the manner of a flat playing card under tension, or a venetian blind.

Figure 1C:
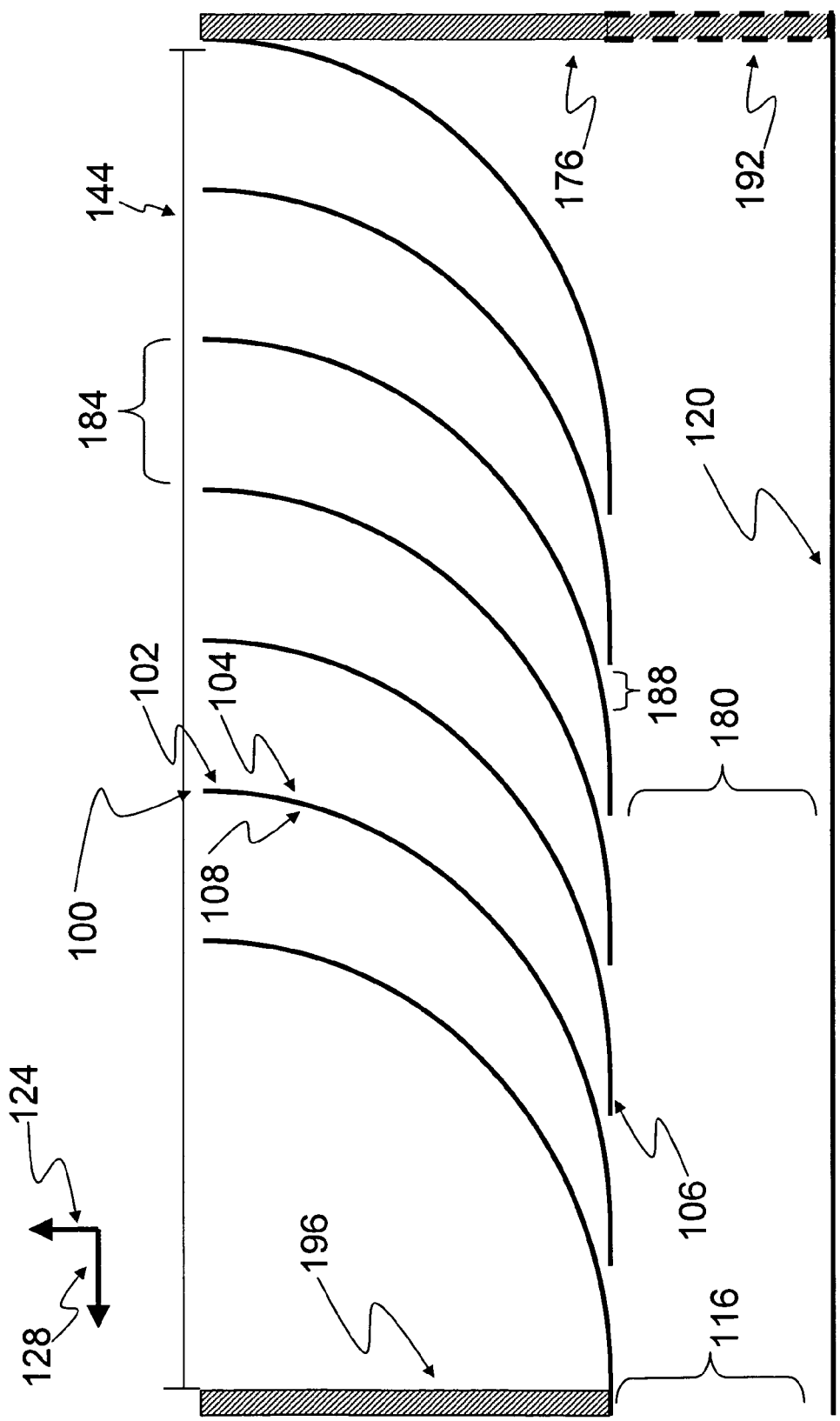
FIG. 1c is a side elevational view of a solar collection according to FIG. 1b.
Figure 1D:
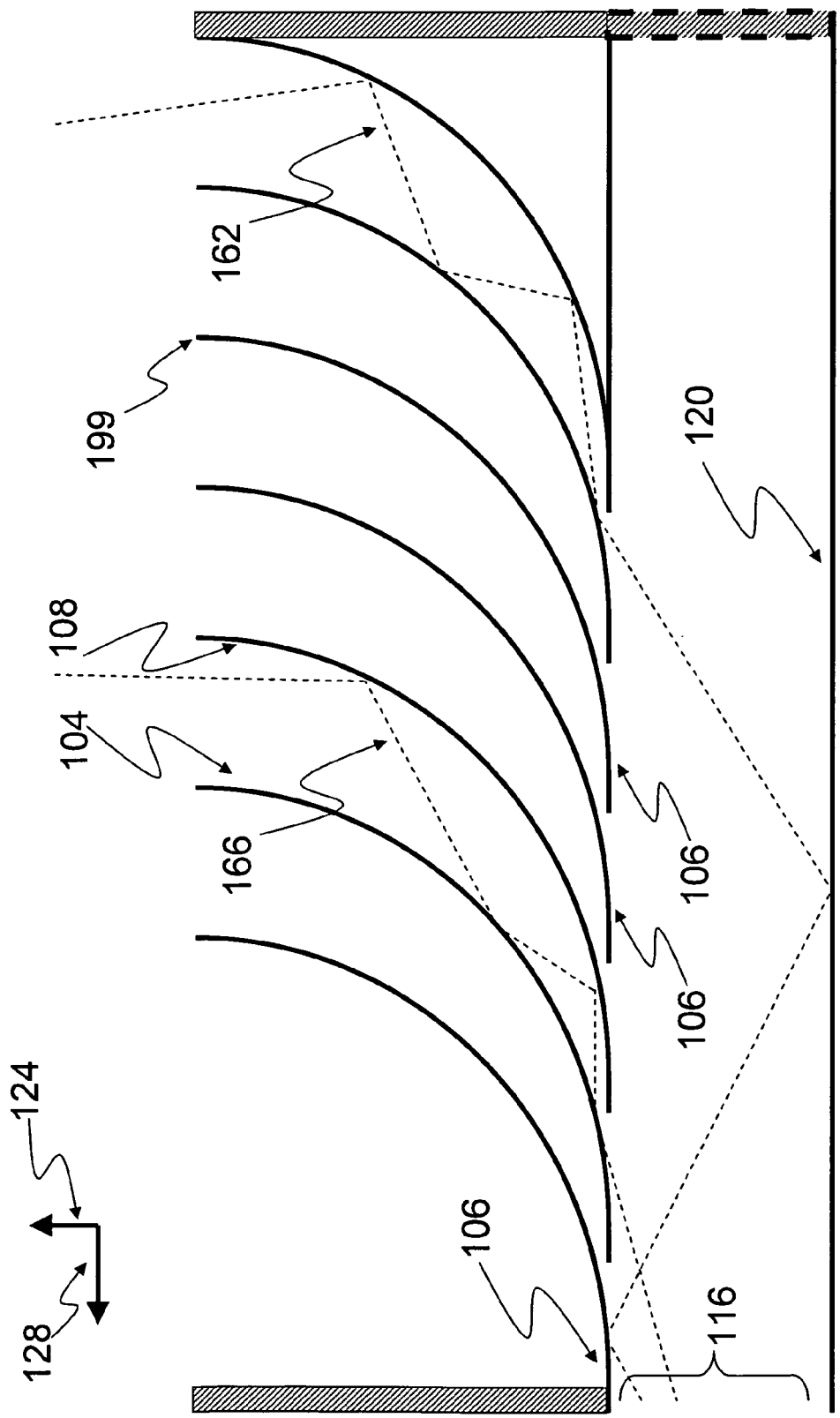
FIG. 1d is the same side elevational view as in FIG. 1c with an illustration of the travel of light rays travelling through the solar collection apparatus.

FIGS. 1c and 1d illustrate the apparatus of FIG. 1b from the side in a cutaway view, to better illustrate the passage of light through the apparatus. Again, FIG. 1c shows a housing 176 with a floor 120 which is at least partially mirrored, with a first opening 144 at its top, and with a second opening 116 at its far end. A plurality of fins 100 are again illustrated, each fin having a first face 104 and a second face 108 of substantially the same curvature, a first end segment 102 extending in a first direction 124, and a second end segment 106 extending in a second direction 128. Again, adjacent faces of the fins have substantially identical curvature to each other. Again, the floor 120 and the second end segments of the fins 106 form a "light pipe" 180, here with mirrored or partially mirrored side walls (not illustrated) and an optional mirrored or partially mirrored rear wall 192. An optional front wall 196 is shown, in which the second opening 116 is made.

As shown in FIG. 1d, a light ray 166 enters the solar collection apparatus in a direction approximately parallel with the top of each fin, since the sun is presumed to be directly overhead of the device. Light reflected off of a mirrored face 104 of a first fin will be directed toward a mirrored face 108 of an adjacent fin, which will in turn reflect the light back to the mirrored face 104 of the first fin, until nearly all light exits through a gap between the second end segments 106 of the fins 100. There, the light travels along the length of the device, reflecting between the floor 120 and the second end segments 106 of the fins. Side walls (not illustrated) may be partially mirrored or mirrored only at their bottoms. Thus, the light pipe 180 may be defined by the floor 120, the second end segments 106, and optionally by the mirrored bottoms of such side walls. The second end segments 106 of the fins 100 prevent the light within the light pipe from exiting the light pipe in the first direction 124. The light within the light pipe 180 thus exits the light pipe at the second opening 116.

As a non-limiting example, the applicants have determined one configuration that is particularly effective at increasing the efficiency of light trapped in the device, although other configurations may be used. In this configuration, the bodies 110 of the fins 100 are circularly curved and there are no flat edges on the bodies 110 of the fins, the gap 184 between the first end segments 102 of the fins 100 is approximately ½ inch, the fins are approximately 0.025 inches thick between their first and second faces 104, 108, and are twenty-four inches wide, and the collecting device is approximately two feet high, as measured from the end edge 199 of each first end segment 102 to the floor 120 in a direction perpendicular to the floor 120. The first end segments 102 of the fins 100 are each nearly perpendicular to the floor 120, and at least ten fins 100 are used. The second end segments 106 of fins 100 are elongated to prevent light from escaping back from the light pipe, such that a gap 188 of one tenth of an inch or less remains between the edge of an end segment 106 and the adjacent fin 100. Collectively, in this configuration, it is believed that no more than 10 reflections will be necessary for any photon to be directed to the end of the device, thereby reducing the heat produced at each reflection. However, other configurations may be used, such as the microapparatus which will be described in reference to FIG. 8 below. Light beams entering between other fins or at different angles, such as light beam 162, are still directed into the light pipe 136.

Again, although a circular curvature is discussed here and believed to be particularly efficacious, other curvatures may be used, including elliptical curvatures, parabolic curvatures, or hyperbolic curvatures.

Figure 2:
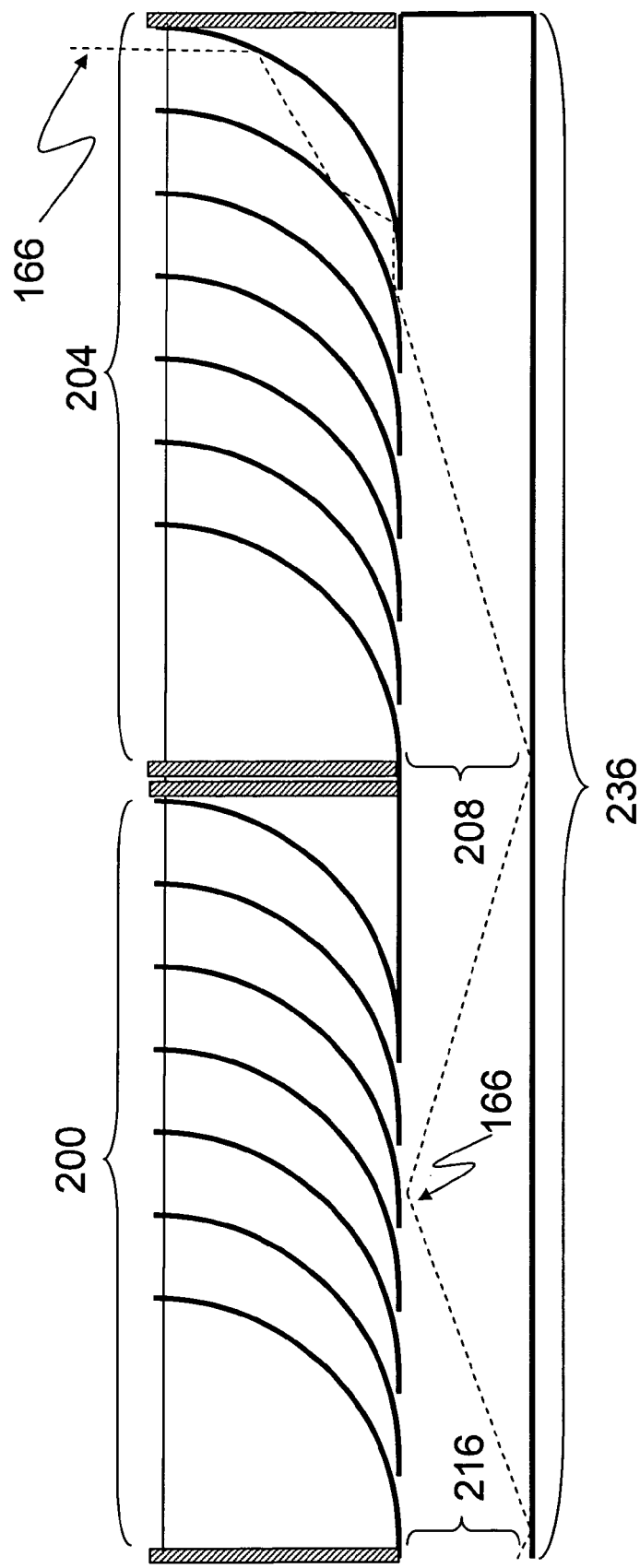
FIG. 2 is a side elevational view of the union of two solar collection apparatuses according to one aspect of the present disclosure.

An array of solar collection apparatuses may be used, where each device abuts a second such device, and the optional rear wall 192 of the light pipe 136 is removed. In this configuration, as shown in FIG. 2, two or more sequential solar collection apparatuses 200, 204 form a common light pipe 236, where the rear wall of device 200 has been removed to form a third opening 208. Light beam 166, entering device 204, continues along the length of the collectively-formed light pipe 236 by passing from the second opening of apparatus 204 into the third opening 208 of apparatus 200.

Figure 3:
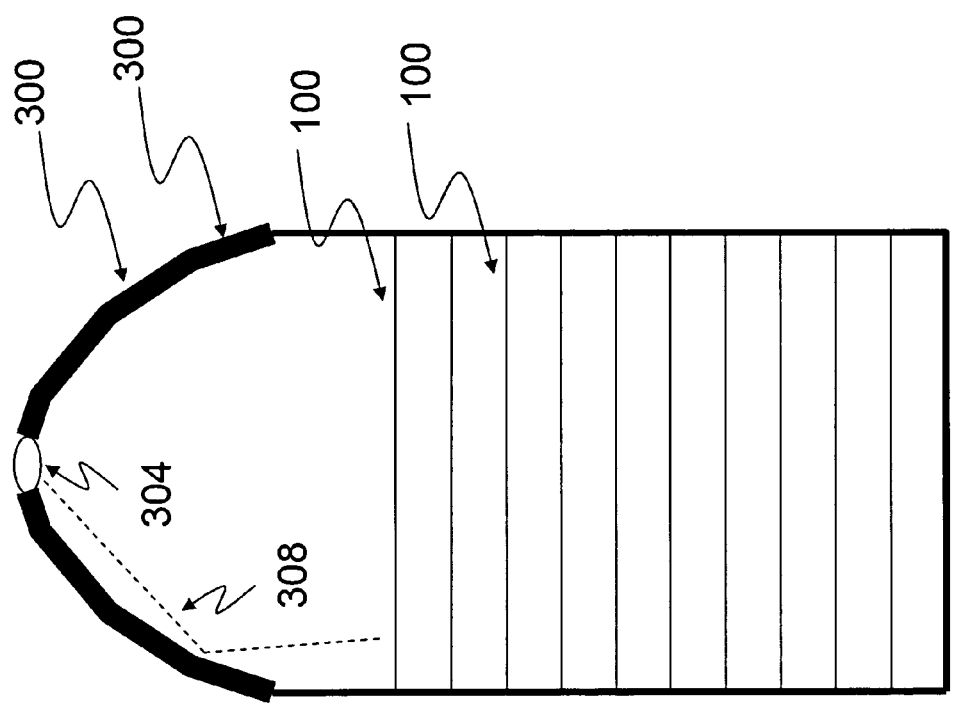
FIG. 3 is a top plan view of an aspect of a solar collection apparatus according to the present disclosure.

Alternatively, or in combination with the above configuration, mirrors or lenses may be placed at the end of one or more light pipes, to further gather or focus the light, where it may then be used to create heat or electricity (for example, by being focused on water in a steam turbine, or on solar cells), or may be channeled by fiber optic cables, or into a fiber optic cable fitting, or along additional light guides for use elsewhere. As shown in the nonlimiting example configuration of FIG. 3, mirrors 300 of varying shapes may be used to guide light beams (such as beam 308) toward an point 304, at which more light pipes or fiber optic cables or a fiber optic cable fitting may be placed. Various interfaces may be used to gather the light and sufficiently focus and collimate it into a fiber optic cable or light passage if needed. This is one solar collection apparatus according to the present disclosure, as seen from above, and other mirrors or light-gathering devices may be used. As a non-limiting example, inverted pyramidal shaped mirrors may also be used.

Alternatively, as shown in FIG. 4, multiple solar collection apparatuses may be used together. This is merely one configuration, and many other configurations may be made. In this configuration, devices 400 and 404 share a light pipe (not visible, as this is a view from above), while devices 408 and 412 share a light pipe. Thus, two configurations of mirrors are used to collect the light exiting each collective light pipe at its respective output (416, 420), where again, it may be sent to a fiber optic, or to an additional light pipe, or may be focused into a beam by a lens (such as beams 424, 428, directed to a focal point 432).

As at least one further non-limiting example, one solar collection apparatus may be used to change the light angle by 45 degrees, and a second to change it by a further 45 degrees, thereby achieving an ultimate angular shift of 90 degrees.

Figure 5B:
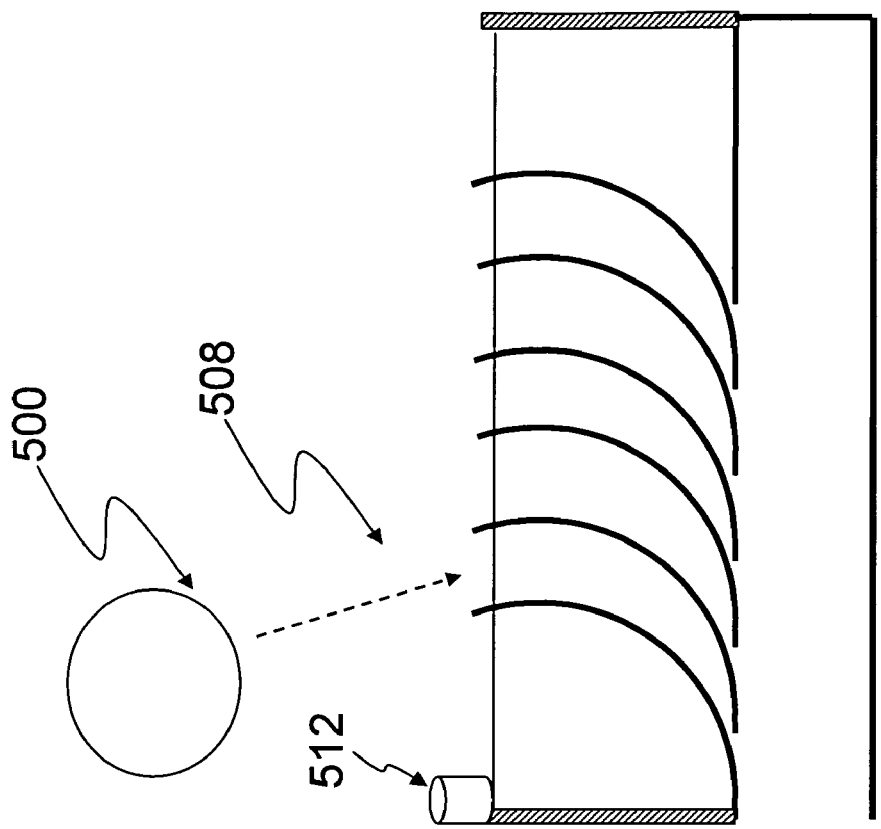
FIGS. 5a and 5b are illustrations showing one aspect of solar tracking for a solar collection apparatus according to the present disclosure.
Figure 5A:
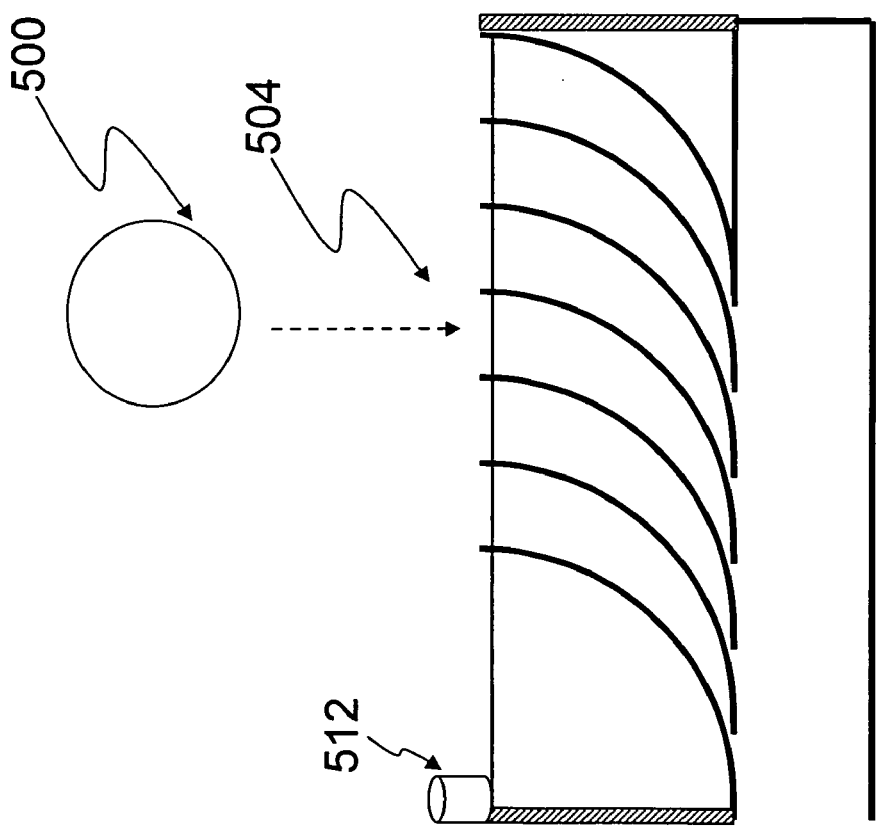

As illustrated in FIGS. 5a and 5b, in some aspects, the fins may be continuously or periodically aligned so that the first direction approximately points toward the sun 500. If not aligned, it is believed that the solar collection apparatus will perform best from around 10:30 AM until 1:30 PM, although this may vary depending on the latitude and time of year over which the device is used. However, if adjustable, the solar collection apparatus may optimally collect sunlight throughout the entire day.

In FIG. 5a, the tops of the fins face sunlight entering in a direction 504, generally perpendicular to the bottoms of the fins because the sun 500 is directly overhead. The arrow shown indicates the direction of the sunlight, which (treating the sun as a point source) will be parallel with the tops of all of the fins. In FIG. 5b the sun has moved, and accordingly, the tops of the fins now face sunlight entering in a new direction 508, but again, coming from the location of the sun. A solar tracking device 512, of which many kinds are known in the art, can be used to locate and/or track the movement of the sun and computer appropriate instructions to align the fins using one or more mechanisms, such as those detailed below.

This alignment may be accomplished in many ways. In some aspects, such as is shown in FIG. 6, each fin is held at two or four of its corners, and one or all of the corners may be moved to align the fin. In FIG. 6, this is illustrated by connectors 604 at the upper corners of each fin, which connect the edges of the fins to the side wall 608 (here removed for visibility), and which can be angularly adjusted to push the top of each fin forward or backward. In addition, connectors 612, at the bottom of each fin, may be used to angularly adjust the fins as well. One possible example of a material which may be used for the connectors 604 and 612 is a plastic electromechanical "muscle," which expands or contracts when a charge is placed on it, through any other known mechanical means may be used, such as springs or cog wheels or combinations thereof, suitable for the size of the device. Although the fins may be aligned from the centers, this has the disadvantage of changing the shape of the fin (for example, a rod through the center of each fin may make a bulge, which lowers the efficiency of each fin at moving light down into the light pipe, and not back up out of the device). Many known forms of solar tracking may be used to direct the fins.

Figure 7:
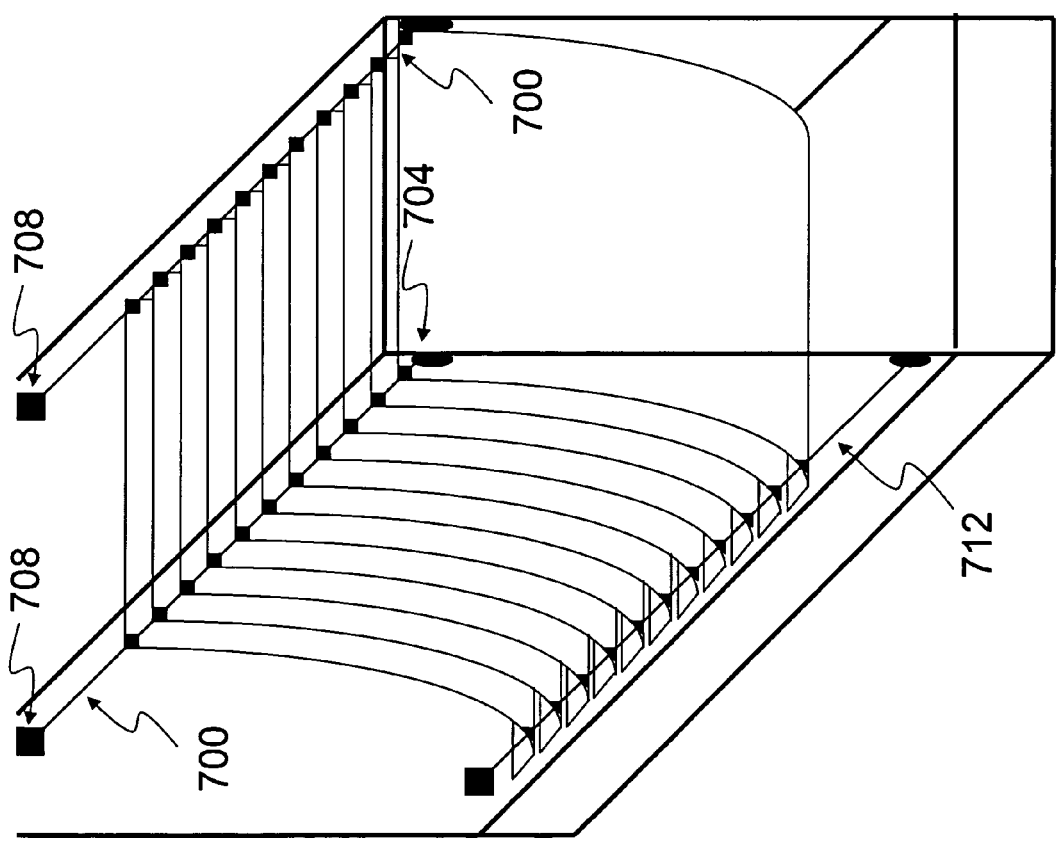
FIG. 7 is a perspective view of another aspect of a solar collection apparatus configured for solar tracking according to the present disclosure.

In some alternative aspects, as shown in FIG. 7, corresponding corners of all fins are connected by "wires," such that movement of any one wire aligns all of the fins by displacing the same corner of each fin by the same distance. The term wire can refer to any elongated body, including (but not limited to) cables, cords, strings, ropes, membranes, chains, or fin flanges. Here, wire 700 connects the upper left corners of all fins. The wire 700 is anchored at one end 708, and connected to a spool 704 at the other end. As the spool takes up or releases wire 700, the fins curl and change their direction. A similar wire is disposed along all of the upper right fin corners. As in FIG. 6, the bottoms may also be controlled, such as by optional wire 712. In some other aspects, not shown, the fins are instead aligned though the movement of stages to which the bottom of each fin is connected, where the stages are in the light pipe but occlude a minimal amount of light, or are reflectively coated themselves.

Figure 8:
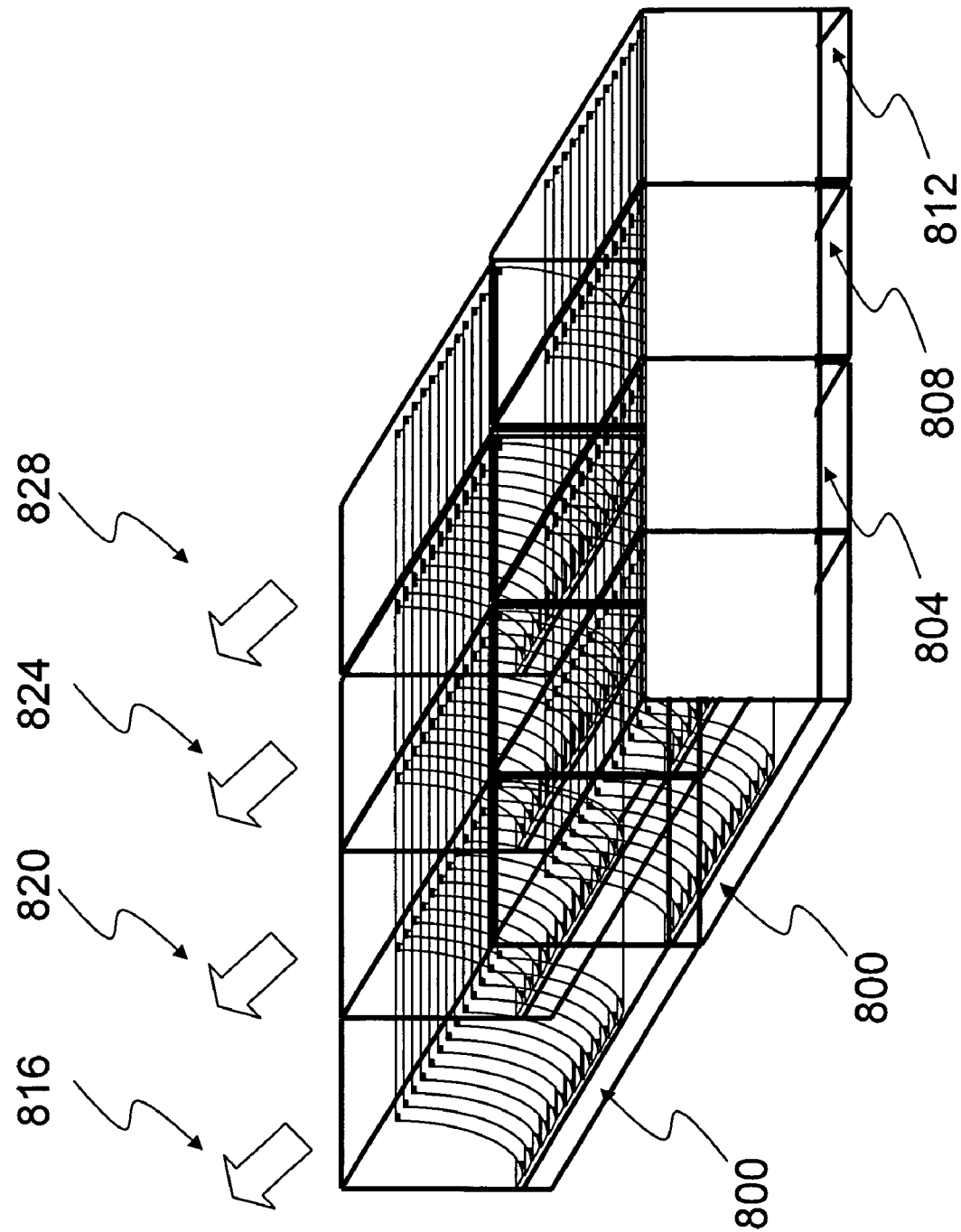
FIG. 8 is a perspective view of eight solar collection apparatuses united together according to another aspect of the present disclosure.

Although the solar collection apparatus may be used as a stand-alone device or in a small array, it may alternatively be configured in the form of a rectangular tile, for use in a large array, such as to tile the roof of a house or garage. Such an array is shown in FIG. 8, where eight solar collection apparatuses together form four light pipes 800, 804, 808, and 812. This tiled array will produce four light outputs 816, 820, 824, and 828 at the end of the device, which may be gathered into one light stream at the end of the tiled surface, such as at the edge of the roof. (Note that the fins are illustrated transparently for ease of disclosure of the present structure, but would of course be partially or fully mirrored in accordance with the present disclosure).

The principles of the solar collection apparatus are believed to be operable at almost any size. Thus, where size is not a concern, each solar collection apparatus may be made of a large size, to minimize manufacturing costs through the use of large structural and adjustable materials, and to capture maximal sunlight at a single device. However, in many situations it may be advantageous to form a solar collection "microapparatus." Such an apparatus can comprise a large array of very small solar collection apparatuses, such as those illustrated in FIG. 8, but only at a height of half of an inch, or even less. In this way, the microapparatus may take the form of a cover or coat over the surface of an object. For example, the microapparatus may be built into the roof of a house, the roof of a vehicle, or into a vehicle cover or sunshade, on or along a median strip of a highway, or may even be built into the material of an article of clothing such as a jacket or hat. It should be noted that one practical limitation to be controlled in the device is the amount of heat produced, particularly where the photons are channeled into a small gap at the bottom of the fins.

Light may be gathered at the end of the material (such as at the edge of the roof of the car, or at the binding of a vehicle cover or clothing) and again used for energy. Although the fins, wires, and support material will be much smaller, the light gathering principles remain essentially the same, and light is gathered into light pipes at the bottom of the microapparatus, and may ultimately be directed to solar cells, turbines, vehicle heaters, or other devices for energy storage, electricity generation, or heat applications.

Locations where apparatuses according to the present disclosure may be used include, but are not limited to, roofs, sidewalks, walls of buildings, or roofs and sides of a car.

This document describes the end product of the search for a practical method of capturing, conversion and use of solar energy impinging upon any surface, preferably at a "sun angle" exactly or nearly perpendicular to the flat surface, or at an oblique angle when the fins of the device have been adjusted. This angle gives the maximum energy extraction from the energy received by that surface. The incoming energy carries with it a large energy potential. The quantity of incoming energy has been measured over recent years and is now generally accepted to be about 1,300 watts per square meter. It will thus be seen that if all of that energy could be harnessed the roof of a typical house, placed in optimum position receives (for 100 square meters, a 10 meter by 10 meter square or equivalent rectangle, 130,000 watts).

One difficulty, up to this time, has been converting the energy gathered into stored energy form, allowing storage for later use, i.e. cloudy days or at night. Solutions available using the present disclosure are several: the immediate transfer of the energy gathered and converted into electricity into the power grid for use by other users thereby avoiding the storage problem; conversion to mechanical energy by pumping water uphill and the later use of that energy through water turbine generators; cracking water into $H_2$ and O and storing the $H_2$ for later use; extracting $CO_2$ from the air and using the energy derived from the system to produce methane or other forms of more readily usable hydrocarbons, and gathering the energy in a solar concentrator or collector in an efficient and usable fashion.

The present disclosure, by collecting solar energy, accomplishes those objectives in a much more efficient manner than previously existing technology. For example, photovoltaic solar cells used alone range in efficiency between 12% and 20%. They are also very expensive and heavy. This embodiment is expected to minimize the number of photovoltaic cells needed to produce the maximum amount of electricity by concentrating the solar energy impinging on them, or alternatively to forgo solar cells altogether and use efficient turbines. It is believed that the present disclosure can help reach energy production efficiency of about 70%.

Other long term and future uses could include using median strips for super highways and south facing hills as the mounting foundation for solar collectors. At convenient intervals generation plants could crack water into $H_2$, and/or store energy produced in the form of capacitors or batteries. As a vehicle leaves the main highway for "recharging" it could pass over charging areas which replenish the battery charges in each vehicle from the mass battery storage, or fill-up with $H_2$.

Being adjacent to hills of moderate height, for example 200-300 feet, would allow the use of water tank storage at heights sufficient to produce a constant supply of hydropower by merely pumping water uphill during the sunny part of the day and recovering during cloudy days or at night, in accordance with U.S. Pat. No. 6,434,942 as referenced above.

Another long term and future use of energy gathered in accordance with the present disclosure could involve storing, removing, or gathering the energy and reflecting it toward space, thereby changing the albedo of the earth and possibly reducing or modifying the effects of global warming.

Another long term and future use could involve the programming of a reflective mode into the array. This would allow a beam of sunlight, in its original form, or, through lasing into coherent radiant energy, to be reflected to a particular spot in the sky for communications or, if combined with other houses, for use in a defensive beam control such as a "star wars" defense system. A sufficiently large concentration of such devices could generate sufficient energy to serve as a diversion defense against large incoming objects from space, like errant asteroids. The energy deployed in the form of laser or non-coherent reflected sunlight could be used to "boil way" sufficient mass to alter the trajectory of such objects.

Another long term and future use could be the placement of the presently disclosed device in outer space solar arrays, where the number of solar cells carried to and used in space could be reduced, and a large number of solar collection apparatuses (which are lighter and less expensive than the solar cells) could be used to concentrate incoming sunlight toward the reduced number of solar cells, improving the overall energy/weight and energy/cost efficiencies, while using each solar cell to its maximum potential.

It should be noted that aspects of the presently disclosed device and method may be used or performed "in reverse;" that is, not only can the device be used to gather solar energy, but a laser beam directed toward the curved body of the fins from the bottom of the device may be deliberately reflected back upward and out of the device, and aimed by the alignment mechanism. In one aspects, the device can be used to gather solar energy and direct it to a laser cavity, where it is made into coherent laser light, which is then directed back outward from the device, such as for the destruction of errant asteroids or of a terrorist airplane, as described above. Through the use of multiple devices at multiple locations, with common control of their alignment mechanisms, a considerable amount of laser energy can be directed to one location in the sky.

Having described the invention in detail and by reference to the embodiments thereof, it will be apparent that modifications and variations are possible, including the addition of elements or the rearrangement or combination or one or more elements, without departing from the scope of the invention which is defined in the appended claims.

What is claimed is:

1. An apparatus for solar collection, the apparatus comprising:
    a housing having at least a first opening for receiving light waves, and a second opening;
    a transfer channel, said transfer channel having a floor wherein the floor is reflective of light waves; and
        an array of at least three fins attached to the housing and adjacent to one another, each fin comprising:
            a first end segment extending in a first direction toward the first opening,
            an elongated second end segment extending in a second direction towards the second opening and extending substantially parallel to but spaced from the floor so as to define the transfer channel between the second end segment and the floor, wherein the second end segment is reflective of light waves, and
            a curved mid-portion located between the first end segment and the second end segment, the mid-portion having a first face that is closest to the second opening and a second face that is away from the second opening, the first face and the second face having substantially the same curvature,
        wherein each face of each fin and each adjacent face of each adjacent fin have substantially the same curvature,
        wherein said second face of one said fin and an adjacent said first face of an adjacent said second fin are reflective of light waves,
        wherein the end of the second end segment of one fin and the second end segment of an adjacent fin are spaced apart so as to provide a small gap therebetween and so that the transfer channel defined by at least the floor and the second end segments of the fins together define a light pipe, such that at least some light impinging on the first opening is directed by reflection between adjacent faces of adjacent fins through the gap between the second end segments of adjacent fins into the light pipe,
        wherein the length of the second end segment of a fin and the curvature of the mid-portion of a fin are such that a vertical plane beginning at the end of the first end segment of a fin and extending towards the floor intersects two fins in the array that are located in a direction away from the second opening;
        wherein the second end segments of the fins prevent the light within the light pipe from exiting the light pipe in the first direction, and
            wherein the light within the light pipe travels towards and exits the light pipe at the second opening.

2. The apparatus of claim 1, wherein the housing comprises two side walls and one front wall,
    wherein the fins are attached to the housing at the side walls, and
    wherein the front wall comprises the second opening.

3. The apparatus of claim 1, wherein each end segment of each fin is flat, and each body of each fin has a circular curvature.

4. The apparatus of claim 2, wherein the side walls are reflective of light waves.

5. The apparatus of claim 1, wherein each body of each fin has a parabolic, hyperbolic, or elliptical curvature.

6. The apparatus of claim 1, wherein each first end segment of each fin comprises a first corner and a second corner, the apparatus further comprising:
    aligning means for at least periodically aligning at least one corner of each fin, so that the first direction faces the sun when in use.

7. The apparatus of claim 6, wherein the aligning means comprise plastic muscles.

8. The apparatus of claim 1, wherein each first end segment of each fin comprises an end edge, and wherein each distance from each end edge to the floor, measured in a direction perpendicular to the floor, is less than 0.5 inches.

9. The apparatus of claim 1, wherein the apparatus is disposed at a location selected from the group consisting of: a surface of an object, a roof of a vehicle, a roof of a building, a shingle of a building, a paint-like layer covering a building, a vehicle cover, a vehicle sunshade, an article of clothing.

10. The apparatus of claim 1, the apparatus comprising at least one solar energy device positioned to receive the light exiting the light pipe at the second opening, the solar energy device selected from the group consisting of: solar cell, turbine, vehicle heater, solar energy storage device, heat storage device.

11. The apparatus of claim 1, wherein each fin has a constant thickness throughout each body.

12. The apparatus of claim 1, wherein each face of each fin and each adjacent face of each adjacent fin are substantially concentric.

13. The apparatus of claim 1, wherein the first direction and the second direction are perpendicular to each other.

14. The apparatus of claim 1, wherein the light pipe is hollow.

15. An apparatus for solar collection, the apparatus comprising:
    a housing having at least a first opening, a second opening, and a transfer channel, said transfer channel having a floor wherein the floor is reflective of light waves; and
    at least two fins attached to the housing and adjacent to one another, each fin comprising:
        a first end segment, extending in a first direction toward the first opening,
        a second end segment, extending in a second direction substantially parallel to the floor, wherein the second end segment is reflective of light waves, and
        a mid-portion of each fin, located between the first end segment and the second end segment, the mid-portion having a first face and a second face, the first face and the second face having substantially the same curvature,
    wherein each face of each fin and each adjacent face of each adjacent fin have substantially the same curvature,
    wherein said second face of one said fin and an adjacent said first face of an adjacent said second fin are reflective of light waves,
    wherein at least the floor and the second end segments of the fins together define a light pipe, such that at least some light impinging on the first opening is directed into the light pipe by reflection between adjacent faces of adjacent fins,
    wherein the second end segments of the fins prevent the light within the light pipe from exiting the light pipe in the first direction,
    wherein the light within the light pipe exits the light pipe at the second opening, and
    wherein each first end segment of each fin comprises a first corner and a second corner, the apparatus further comprising:
    aligning means for at least periodically aligning at least one corner of each fin, so that the first direction faces the sun when in use.

16. An apparatus for solar collection, the apparatus comprising:
    a first opening;
    a second opening;
    a transfer channel reflective of light waves and having a floor reflective of light waves; and
    at least three elongate fins having in cross section a concave surface facing said second opening and a convex surface facing away from said second opening, said fins being spaced apart from each other so as to form a line array of fins adjacent to one another, each fin comprising:
        a first end segment, extending in a first direction toward the first opening,
        a elongated second end segment, extending in a second direction towards the second opening and extending substantially parallel to but spaced from the floor of the transfer channel,
        wherein the second end segment is reflective of light waves, and a mid-portion of each fin, located between the first end segment and the second end segment, the mid-portion having a first face and a second face, the first face and the second face having substantially the same curvature,
    wherein each face of each fin and each adjacent said face of each adjacent fin have substantially the same curvature,
    wherein said second face of one said fin and an adjacent said first face of an adjacent said second fin are reflective of light waves, wherein at least some light impinging on the first opening is directed by the first end segments of the fins toward the second end segments of the fins and by reflection between adjacent faces of adjacent fins, into the transfer channel,
    wherein a vertical plane beginning at the end of the first end segment of a fin and extending toward the floor intersects two fins in the array that are located in a direction away from the second opening,
    wherein the curvature of the second end segments of the fins prevent the light within the transfer channel from exiting the transfer channel in the first direction, and
    wherein the light within the transfer channel exits the transfer channel at the second opening.

17. The apparatus of claim 16, wherein the transfer channel further comprises a floor, the floor being absorptive or reflective of light waves.

18. The apparatus of claim 16, wherein the transfer channel is hollow.

19. The apparatus of claim 16, wherein each first end segment of each fin comprises a first corner and a second corner, the apparatus further comprising:
    aligning means for at least periodically aligning at least one corner of each fin, so that the first direction faces the sun when in use.

20. The apparatus of claim 19, wherein the aligning means comprise plastic muscles.

21. The apparatus of claim 16, wherein the first direction and the second direction are perpendicular to each other.

22. The apparatus of claim 16, wherein the fins are oriented in substantially the same direction.

* * * * *